July 23, 1940.  S. C. WATSON  2,208,614
SHAFT COUPLING
Filed July 10, 1937  3 Sheets-Sheet 1

Inventor
Sydney C. Watson
by Parker + Carter
Attorneys.

July 23, 1940.  S. C. WATSON  2,208,614
SHAFT COUPLING
Filed July 10, 1937   3 Sheets-Sheet 2

Inventor
Sydney C. Watson
by Parker + Carter
Attorneys.

July 23, 1940.  S. C. WATSON  2,208,614
SHAFT COUPLING
Filed July 10, 1937   3 Sheets-Sheet 3

Fig. 3

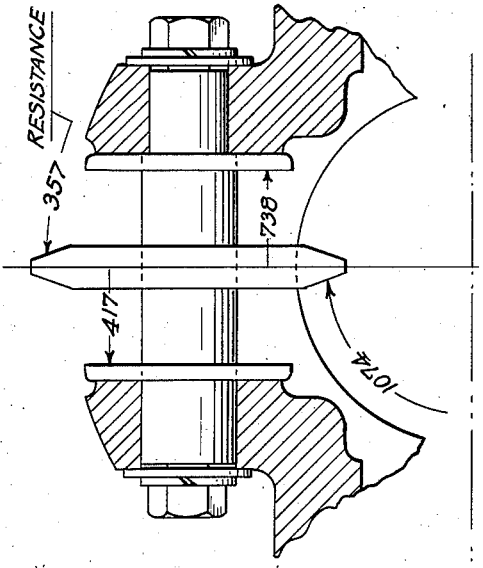

FORCES ACTING DURING DIRECT DRIVE WITH THE WORMS STATIONARY ABOUT THEIR AXES AND THE WHOLE ASSEMBLY ROTATING AS ONE PIECE.

Fig. 4

| TORQUE VELOCITY RATIOS | | | | |
|---|---|---|---|---|
| REVOLUTIONS PER MINUTE. | | | | TORQUE VELOCITY RATIO. |
| 16-TEETH DRIVE GEAR | CENTER RETAINER | 8-TEETH IDLER WORMS | 48 TEETH DRIVEN GEAR | |
| 1000 | 0 | 2000 | 333⅓ | 3—1 |
| 1000 | 100 | 1800 | 400 | 10—4 |
| 1000 | 250 | 1500 | 500 | 10—5 |
| 1000 | 400 | 1200 | 600 | 10—6 |
| 1000 | 550 | 900 | 700 | 10—7 |
| 1000 | 700 | 600 | 800 | 10—8 |
| 1000 | 850 | 300 | 900 | 10—9 |
| 1000 | 1000 | 0 | 1000 | DIRECT |

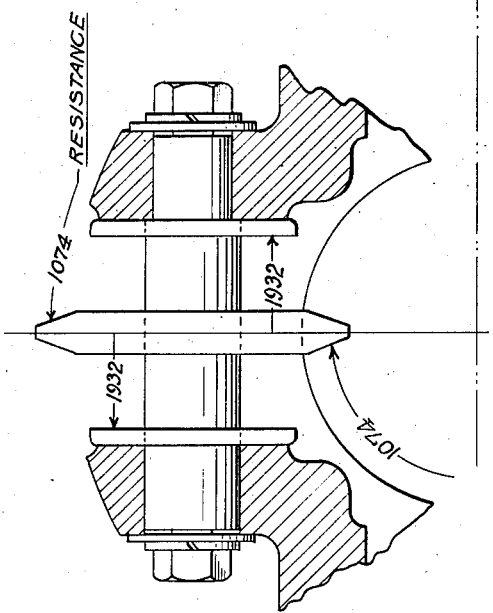

FORCES ACTING DURING TOTAL REDUCTION OF 3-1 WITH THE CENTER RETAINER STATIONARY-AND THE WORM ROTATING ABOUT THEIR OWN AXES.

Inventor
Sydney C. Watson
by Parker & Carter
Attorneys.

Patented July 23, 1940

2,208,614

UNITED STATES PATENT OFFICE 2,208,614

SHAFT COUPLING

Sydney C. Watson, Chicago, Ill., assignor to Tor-Vel Associates, having as trustees Sydney C. Watson, Alvin J. Parcelle, and William J. Angus Application July 10, 1937, Serial No. 152,900

8 Claims. (Cl. 74—280)

This invention relates to a shaft coupling and may be used in almost any association in which it is desired to connect two shafts together.

In the particular form shown the shafts have a common axis and power is transmitted from one to the other. One object of the invention is to provide a shaft coupling for a driving and a driven shaft so arranged that the two shafts may move at the same speed and torque or at different speeds and different torques and in which the two shafts are driven or caused to rotate in the same direction, irrespective of any variation between them in speed or torque.

Other objects will appear from time to time in the specification and claims.

The invention is illustrated more or less diagrammatically in the accompanying drawings, wherein:

Fig. 3 is a diagrammatic illustration of the forces involved in one form of the present invention; and Fig. 4 is a table illustrating torque and revolution relationship for one particular design.

Like parts are designated by like characters through the specification and drawings.

Figure 1:
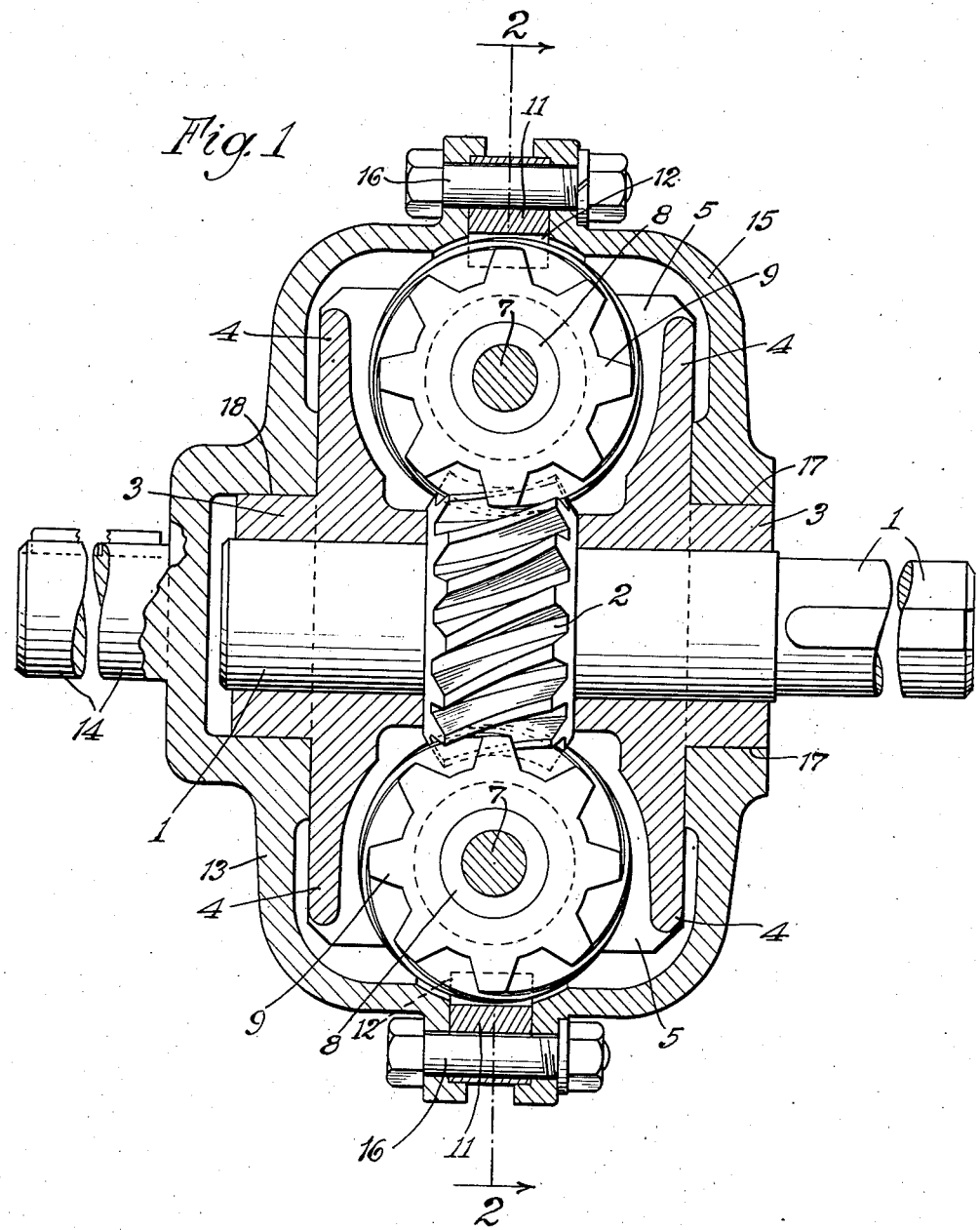
Figure 1 is a longitudinal section through the coupling with parts broken away and parts in elevation.

1 is a shaft which, for the purposes of the present explanation, may be considered as the driving shaft and it may be driven by any suitable source of power. Fixed to it or made integral with it is an external gear 2 having teeth cut on a helix or thread described about its own axis. A gear of this type is generally known as a worm gear, in the trade.

Positioned freely upon the shaft 1 so that it may under certain circumstances rotate with respect to the shaft is a retainer or carrier which embodied, in the particular form here shown, two sleeve-like portions 3, 3, positioned upon opposite sides of the gear 2 and bearing upon the two sides or sections of the shaft 1. Extending radially from each of the sleeve-like portions 3 are, in the present form of the invention, four web portions 4. Each of these portions is joined by a pair of transverse members or sections 5 and each of these members 5 is perforated as at 6 to receive a shaft 7. Upon each of the shafts 7 is preferably mounted a bushing 8 upon which is positioned a worm or helical gear 9, having a plurality of threads or a gear whose teeth form a portion of a plurality of screw threads or helixes described about the axis of said gears. Throughout the specification and claims these worms or gears will be referred to as idler worms or idler gears. Each of the worm gears meshes with the gear 2. Members 10 may be positioned upon each of the shafts 7 between one end of a gear 9 and the adjacent member 5. For purposes of simplicity the bearing and support of the gears 9 is shown without antifriction members. It is to be understood of course that for many purposes antifriction bearings of one type or another will be used but since the present invention is not directed primarily to any particular bearing construction or arrangement the drawings have been simplified by the omission from them of antifriction bearings and conventional bearings have been shown. The invention is not limited to any bearing construction.

Surrounding the parts thus far described and having the same axis as the gear 2 is an internal gear 11 which in the form here shown has teeth 12 cut in a helix described about its axis. The gear 11 is fastened to a shell 13 which carries or is fastened to a driven shaft 14. 15 is a second portion of the shell secured to the gear 11 and to the shell portion 13 by means of bolts 16 or otherwise. This shell portion 15 bears upon one of the members 3 of the retainer carrier at 17 and the shell portion 13 bears upon the other retainer or carrier portion 3 at 18. Thus bearing, steadying and positioning of the shell and through it of the gear 11 is satisfactorily provided. It is understood that this is not an essential feature of the invention and the shell might have bearing directly upon the shaft 1 and need not be supported upon any part of the retainer or carrier. The present arrangement has the advantage of compactness but it is not essential.

In the diagram of Fig. 3 a single gear with a single tooth is illustrated for purposes of simplicity and the gears may be considered as the equivalent of one of the gears 9 with the associated supporting parts. The lever marked "Foot pounds torque" in the center of Figure 3 should be considered as one foot in length. Then it will be in the same scale with the gears and associated parts shown to the right and to the left of the lever and illustrates with those parts diagrammatically two conditions which occur during the use of the device illustrated more in detail in Figs. 1 and 2. Thus if a force of 100 pounds were applied at the end of a lever 12 inches in length, a force of 1074 lbs. will be applied to the gears of the device, whether there be one or more than one gear in use in a given device. When the resistance on the driven shaft 14 is of the order indicated at the right hand of Fig. 3, no relative movement of the parts occurs, the gears or worms do not rotate about their axes and the entire assembly rotates as one piece, driving shaft 1 and driven shaft 14 rotating at the same speed.

When the resistance on the driven shaft increases sufficiently a condition develops in which relative movement of the parts within the coupling occurs and the situation indicated at the left hand of Fig. 3 develops. The condition there illustrated is the extreme condition of rotative speed reduction and torque increase possible in a device having the dimensions indicated and having the gear relationship illustrated in the table of Figure 4. Thus as shown to the left of Figure 3, a 3 to 1 reduction between the speed of driving shaft 1 and driven shaft 14 has developed. The center retainer is stationary and the worms or gears are rotating about their axes. It is to be understood that almost an infinite number of different conditions can occur between the two situations illustrated to the right and to the left of Figure 3, respectively. For the particular arrangement illustrated in the diagram of Figure 4 there is a maximum variation from the direct drive shown to the right of Figure 3 and the 3 to 1 reduction shown to the left of Figure 3. An almost infinite number of rotative speed reduction ratios less than the maximum can occur.

Figure 2:
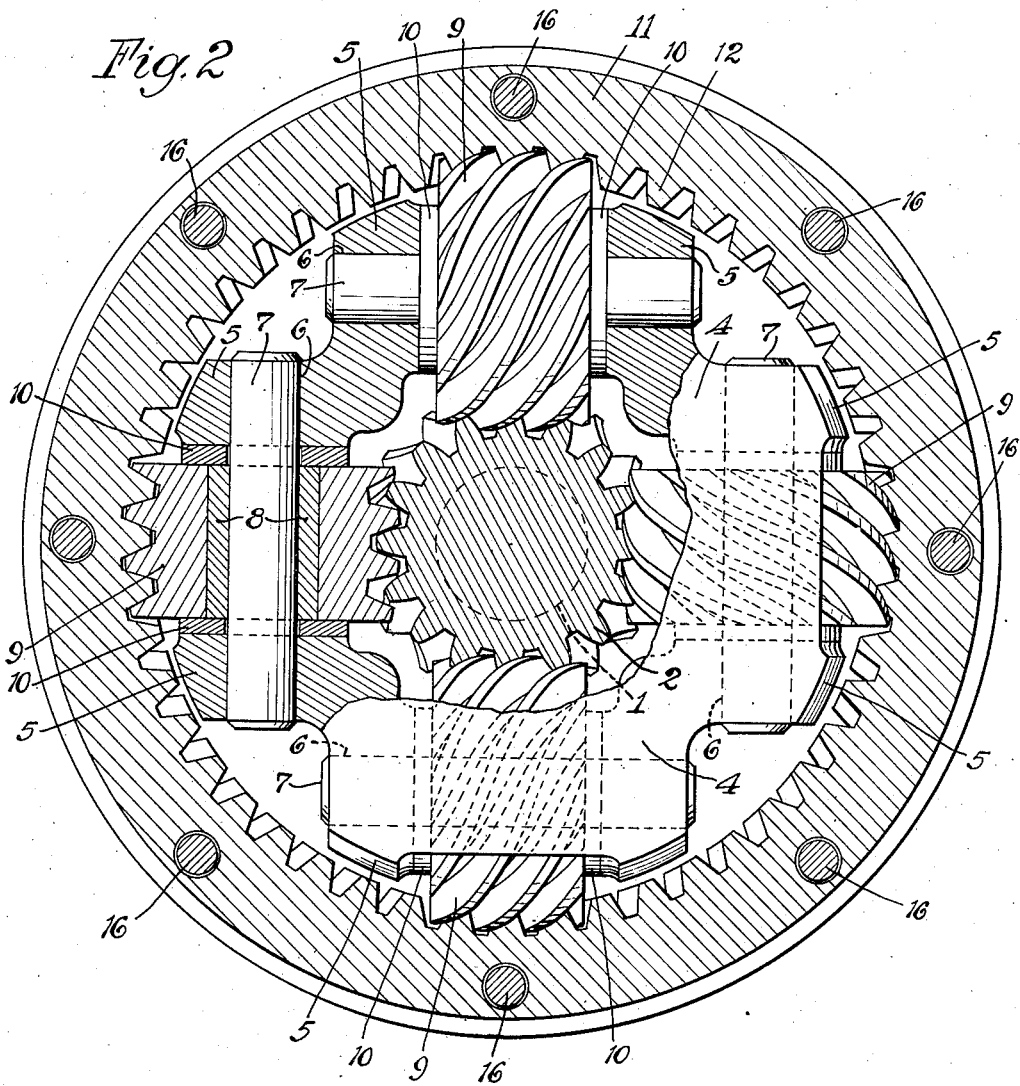
Figure 2 is a transverse section taken at line 2—2 of Figure 1 with certain parts broken away and certain parts in elevation.

The diagram of Figure 4 illustrates a number of torque-velocity ratios which can occur in a device such as that shown in Figures 1 and 2 and illustrated in diagram in Figure 3, the drive gear 2 having sixteen teeth, the idler gears or worms 9 having eight teeth and the driven gear 11 having forty-eight teeth. The particular relationship illustrated in Figure 4 is a typical one, but a great number of other relationships may occur, dependent on the purpose of the designer and the problem of the particular design.

If the resistance on the driven shaft is sufficiently low, no reduction takes place and the drive from the driving shaft to the driven shaft is "straight through," the coupling assembly rotating as one piece. As the resistance increases this condition changes. The center retainer may rotate or the idler gears may rotate or both, as indicated in the table of Figure 4 and the condition will vary automatically from one extreme to the other, depending upon the amount of resistance on the driven shaft.

The use and operation of the invention are as follows:

The device of the present invention may be used in a great many different associations. In general, however, it will be used where one shaft is to be driven from another, that is to say, where power is transmitted from one shaft to the other.

The external gear 2, acting as a driving gear, drives the internal gear 11 by means of the gears 9 and from the gear 11 through the shell 13 drives the shaft 14. The gears 9, acting as idler gears, furnish the connection between the gear 2 and the gear 11. As shown they are in mesh or contact with the gear 2 and the gear 11. While four such gears are shown, almost any number might be used and the invention is not limited to any particular number of idler gears. In the particular form here shown four are used because balance is achieved in that manner and the axes of the several idler gears lie at an angle to the plane of the axis of the driving and driven shafts. These gears are carried in the carrier or retainer by means of which they are supported and held in proper alignment in the total assembly. Each gear is free to rotate upon its own axis under certain conditions and the assembly of idler gears, including the carrier which supports them, may rotate with relation to the gear 2 or the gear 11.

The helix angle of the idler gears is preferably of such a degree that they are reversible, that is, said helix angle is steep enough to permit said idler worms or gears to be rotated about their axes by the driving action of the external gear 2 under certain conditions.

In practice when the device is in use and the driving shaft 1 is rotated by any suitable source of power, its rotation is communicated from the gear 2 to the internal driven gear 11 by means of the axial thrust of the idler gears 9. The driven gear 11, with the shell 13 and the driven shaft 14 attached to it, then rotates as a unit with these parts, and the two shafts 1 and 14 rotate in the same direction. They may rotate at the same speed. When that occurs the idler gear assembly, including the idler gears and the carrier or support, do not rotate with relation to the driven gear, 11. Under other conditions, however, the shaft 14 may rotate more slowly than the shaft 1, and in that case relative movement of the gear 11 with respect to the gear 2 occurs, and the idler gears 9 may rotate about their respective axes.

I claim:

1. In combination in a coupling, a driving shaft, a gear fixed thereon, a driven shaft coaxial with said driving shaft, a gear connected thereto, and means interposed between said two gears for causing them to rotate in the same direction, said means including reversible barrel-shaped idler gears in mesh with both the driving and driven gears and positioned to move the driven gear by their axial thrust.

2. In combination in a coupling, a driving shaft, an external worm gear fixed thereon, a driven shaft co-axial with said driving shaft, an internal worm gear connected thereto, and means interposed between said two gears for causing them to rotate in the same direction, said means including barrel-shaped idler worm gears in mesh with both the driving and driven gears and positioned to move the driven gear by axial thrust, the axes of rotation of said idler gears each lying at an angle to the axis of said driving and driven gears.

3. In combination, a shaft, an external worm gear thereon and fixed thereto, a coaxial carrier positioned upon said shaft for rotation with respect thereto, a plurality of barrel-shaped idler worm gears supported in said carrier for rotation with respect thereto, an internal driven worm gear coaxial with respect to said shaft, positioned about said idler gears and in mesh with them, a shell secured to said internal driven gear, said shell being provided with bearings positioned coaxially with respect to said shaft, and a second or driven shaft secured to said shell and coaxial with said first mentioned shaft.

4. In combination, a shaft, an external worm gear thereon and fixed thereto, a coaxial carrier positioned upon said shaft for rotation with respect thereto, a plurality of idler gears supported in said carrier for rotation with respect thereto, an internal driven gear coaxial with respect to said shaft, positioned about said idler gears and in mesh with them, a shell secured to said internal driven gear, said shell being provided with bearings positioned coaxially with respect to said shaft and bearing upon said carrier, and a second or driven shaft secured to said shell and coaxial with said first mentioned shaft.

5. In combination, a shaft, an external worm gear thereon and fixed thereto, a coaxial carrier positioned upon said shaft for rotation with respect thereto, a plurality of idler barrel-shaped worm gears supported in said carrier for rotation with respect thereto, the individual axes of said idler gears being positioned at an angle to and in a different plane from the axes of said driving gear, an internal driven worm gear coaxial with respect to said shaft, positioned about said idler gears and in mesh with them, a shell secured to said internal driven gear, said shell being provided with bearings positioned coaxially with respect to said shaft, and a second or driven shaft secured to said shell and coaxial with said first mentioned shaft.

6. In combination in a coupling, a driving shaft, a driven shaft, a gear secured to said driving shaft and a gear secured to said driven shaft, each rotatable in unison with its shaft, a reversible barrel-shaped idler worm gear in mesh simultaneously with the gear of the driving and the gear of the driven shaft, a carrier upon which said idler is rotatably mounted, said carrier being rotatable about the axis of the driving and driven shafts, said carrier being free to rotate with respect to the driving gear, the rotation of the idler gear on its axis and the relative rotation of the driving gear, the carrier and the driven gear being dependent upon the torque required by the driven member and the torque available from the driving member, the driving and driven shafts being thereby adapted to rotate in unison with the idler and carrier serving as a solid connection until the effort available falls below that required.

7. In combination in a coupling, a driving shaft, an external worm gear fixed thereon, an idler carrier positioned coaxially with said shaft and free to rotate with respect thereto, a plurality of reversible barrel-shaped idler worm gears mounted upon and for rotation with respect to said carrier, the axis of rotation of said idler gears differing from the axis of said shaft and said external gear, an internal driven gear in mesh with said idler gears, said internal driven gear being coaxial with and lying generally in the same plane as said external driving gear, a driven shaft coaxial with said driving shaft and said driven gear, and a connection between said driven gear and said driven shaft, the axes of rotation of said idler differing from the axis of said shaft and said external gear, said axis lying in such planes that said idler gears form a screw having a plurality of threads, while the external and internal gears form in effect two halves of a split nut of infinite length which bear upon and mesh with these threads, the halves of said split nut being constrained to move in a circular path at a given radius about the common axis of the driving and driven shaft, the internal driven gear being caused to rotate with relation to the idler worm carrier by the screw-like action of the idler worms when rotating about their axes.

8. In combination, an external worm gear and an internal worm gear positioned thereabout, means for driving the external gear and additional means for driving the interal gear from the external gear in the same direction as the latter, said means including a plurality of barrel-shaped, reversible, multi-thread worm or helical gears positioned intermediate said two first mentioned gears and meshing with both of them.

SYDNEY C. WATSON.